United States Patent
Xue et al.

(10) Patent No.: US 8,707,156 B2
(45) Date of Patent: Apr. 22, 2014

(54) RENDER ENGINE FOR SPREADSHEET

(75) Inventors: Wei Xue, ShangHai (CN); Shuai Zhao, ShangHai (CN); Leo Chi-Lok Yu, Tusen Wan (HK)

(73) Assignee: Business Objects, S.A., Levallois-Perret (FR)

( * ) Notice: Subject to any disclaimer, the term of this patent is extended or adjusted under 35 U.S.C. 154(b) by 690 days.

(21) Appl. No.: 12/417,445

(22) Filed: Apr. 2, 2009

(65) Prior Publication Data

US 2010/0257439 A1    Oct. 7, 2010

(51) Int. Cl.
G06F 17/00    (2006.01)

(52) U.S. Cl.
USPC ........... 715/212; 715/213; 715/217; 715/219; 715/220

(58) Field of Classification Search
USPC .......................... 715/212–213, 217, 219–220
See application file for complete search history.

(56) References Cited

U.S. PATENT DOCUMENTS

| | | | |
|---|---|---|---|
| 6,112,214 A * | 8/2000 | Graham et al. | 715/212 |
| 6,317,750 B1 * | 11/2001 | Tortolani et al. | 715/853 |
| 6,738,079 B1 * | 5/2004 | Kellerman et al. | 715/763 |
| 7,237,188 B1 * | 6/2007 | Leung | 715/209 |
| 2002/0032678 A1 * | 3/2002 | Cornwell et al. | 707/3 |
| 2002/0196287 A1 * | 12/2002 | Taylor et al. | 345/792 |
| 2004/0049730 A1 * | 3/2004 | Ishizaka | 715/503 |
| 2004/0205536 A1 * | 10/2004 | Newman et al. | 715/509 |
| 2005/0050088 A1 * | 3/2005 | Kotler et al. | 707/102 |
| 2005/0094207 A1 * | 5/2005 | Lo et al. | 358/1.18 |
| 2006/0069696 A1 * | 3/2006 | Becker et al. | 707/102 |
| 2006/0075328 A1 * | 4/2006 | Becker et al. | 715/503 |
| 2006/0107196 A1 * | 5/2006 | Thanu et al. | 715/503 |
| 2006/0136808 A1 * | 6/2006 | Chirilov et al. | 715/503 |
| 2007/0016849 A1 * | 1/2007 | Aureglia et al. | 715/503 |
| 2007/0130503 A1 | 6/2007 | Voshell | |

FOREIGN PATENT DOCUMENTS

WO    WO 2008107665 A2 *    9/2008    .............. G06F 17/24

OTHER PUBLICATIONS

No Author; Microsoft Excel 2002; 2001; Microsoft Corporation; Version 10.2614.2625; pp. 1-50.*

* cited by examiner

*Primary Examiner* — Chau Nguyen
(74) *Attorney, Agent, or Firm* — Schwegman, Lundberg & Woessner, P.A.

(57) ABSTRACT

A render engine for a spreadsheet application is described. The render engine facilitates the rendering of cell regions containing data that are maintained by both a spreadsheet application (user-defined cell region) and/or a third-party application (application-defined cell region). In particular, an embodiment of the render engine facilitates the repositioning of one or more existing cell regions within a spreadsheet interface, when the insertion of a new cell region is determined to cause a layout conflict with one or more existing cell regions. Repositioning of the existing cell regions is achieved without overwriting any cell information, and without breaking any formulas contained within an affected cell.

22 Claims, 11 Drawing Sheets

BEFORE

TABLE A

| | + Drink | + Food |
|---|---|---|
| − All Customers | 24597 | 191940 |
| − USA | 24597 | 191940 |
| + CA | 7102 | 53656 |
| + OR | 6106 | 48537 |
| + WA | 11389 | 89747 |

TABLE B

| | − All Marital Status | M | S |
|---|---|---|---|
| − All Customers | 266773 | 135032 | 131741 |
| − USA | 266773 | 135032 | 131741 |
| + CA | 74748 | 36074 | 38674 |
| + OR | 67659 | 35365 | 32294 |
| + WA | 124366 | 63593 | 60773 |

AFTER

TABLE A

| | − Drink | | | + FOOD |
|---|---|---|---|---|
| | − ALCOHOLIC BEVERAGES | + BEVERAGES | + DAIRY | |
| − All Customers | 6838 | 13573 | 4186 | 191940 |
| − USA | | | 4186 | 191940 |
| + CA | | | 1280 | 53656 |
| + OR | | | 1041 | 48537 |
| + WA | 3222 | 6302 | 1865 | 89747 |

TABLE B

| | − All M M | | S |
|---|---|---|---|
| | | + FOOD | |
| | | 135032 | 131741 |
| | | 135032 | 131741 |
| | | 36074 | 38674 |
| | | 35365 | 32294 |
| | | 63593 | 60773 |

Figure 2

RENDER ENGINE FOR SPREADSHEET

TECHNICAL FIELD

The present disclosure generally relates to spreadsheet applications. Some example embodiments relate more specifically to methods and apparatuses for rendering regions of cells within a spreadsheet.

BACKGROUND

Spreadsheet applications (e.g., MICROSOFT EXCEL, GOOGLE DOCS, OPEN OFFICE) are primarily designed for performing computations on numeric values and presenting numeric data. Typically, a spreadsheet application displays multiple cells that together make up a grid consisting of rows and columns. Each spreadsheet cell may be associated with a variety of cell properties. For instance, a cell may contain a simple data value including alphanumeric text or a numeric value. Similarly, a cell may contain a formula for calculating a numeric value. When a spreadsheet cell contains a formula, the formula defines how the contents of that cell are to be calculated from the contents of any other cell (or combination of cells) each time any cell is updated. Finally, a cell may be associated with one or more cell properties defining how the data (directly defined, or derived by formula) are to be formatted when displayed.

The data displayed within the cells of a spreadsheet are typically stored within one or more data structures (e.g., cell objects) that are maintained and managed by the spreadsheet application, or in some cases, a third-party application. The spreadsheet component that reads the data from the spreadsheet application's native cell storage structure(s) and generates a visual representation of the data is referred to as a render engine. It is the render engine, for example, that processes the various cell properties (e.g., data, formulas and formatting directives) associated with each spreadsheet cell to generate a visual representation of the data associated with each cell. When a user changes the data value of a cell, the render engine updates the visual representation of that cell, as well as any other cells with formulas that are dependent upon the updated cell.

Recently, software application vendors—particularly vendors with software applications used for managing, presenting and reporting business information, such as financial data—have been increasingly providing a mechanism for presenting application data within a cell region of a spreadsheet in a spreadsheet application. To distinguish between cell regions that display data maintained and managed by a third-party application and cell regions that display data maintained and managed by the spreadsheet application, those cell regions displaying data maintained and managed by a third-party application are referred to herein as application-defined cell regions, while those cell regions displaying data that are maintained and managed by the spreadsheet application are referred to herein as user-defined cell regions.

Unfortunately, the native render engine of many spreadsheet applications is not designed to adequately handle some of the advanced data processing and presentation techniques that are made available by third-party applications. Specifically, in a situation where a third-party application is configured to present data via the interface of a spreadsheet application, when the processing of certain commands results in the insertion of a new cell region or the appendage of new cells to an existing cell region, the native render engine of the spreadsheet application may not generate a proper visual representation of the affected cells. In some cases, the insertion of a new cell region, or the appendage of new cells to an existing cell region, results in the overwriting of the cells of another existing cell region. This may occur, for example, as a result of processing a data insertion command, a data refresh command, or a command associated with an advanced data presentation method. In any case, oftentimes the result is that cell properties of an existing cell are overwritten and lost. This may have a domino effect as it impacts not only those cells which are directly overwritten, but also any cells that contain formulas that reference a cell that is overwritten. The following examples provide a more precise description of the nature of the problem.

In FIG. 1, two tables (i.e., Table A and Table B) are shown prior to, and after, a data refresh command is processed by the native render engine of a spreadsheet application. In this example, Table A contains and displays data that are managed and maintained by a third-party application. As such, Table A is an application-defined cell region and is subject to being asynchronously and dynamically refreshed by the third-party software application. When the data refresh command is processed, the data set increases and additional rows of data are appended to the bottom of Table A. For example, the rows in Table A associated with ID's 8, 9 and 10 are appended to the bottom of Table A as a result of processing the refresh command. Consequently, the first three columns of the four columns in Table B are shifted downward by three cells to accommodate the addition of the three rows to Table A. As illustrated in FIG. 1, as a result of processing the data refresh command, the rows of Table B are incorrectly displayed. In this example, only the layout of the cell region comprising Table B appears to be broken. However, it should be readily apparent that the problem is compounded when formulas are involved. For instance, if any data displayed in Table B are derived from a formula, the repositioning of the cells of Table B may break the formula, resulting in incorrect data being displayed. Similarly, when the cells of another cell region (e.g., other than Table B) derive their values from the data in the cells of Table B, the repositioning of cells in Table B will break the formulas associated with those other cells and again cause incorrect data to be displayed.

To address the problem illustrated in FIG. 1, in some scenarios, the user of the spreadsheet application may be left with no choice but to resolve the layout issue manually, for example, by anticipating the potential size of Table A, and ensuring that the destination region is large enough to display any future cells appended to Table A. However, when Table A is an application-defined cell region, such that the underlying data is maintained and managed by a third-party software application, it may be difficult, if not impossible, for the user to anticipate future changes to the data and the ultimate size of the data set. Accordingly, the data presented in Table A may be automatically and dynamically refreshed, thereby increasing or decreasing the size of Table A.

FIG. 2 illustrates another example of a problem that may exist with a spreadsheet application's native render engine when used in conjunction with third-party data presented in an application-defined cell region of the spreadsheet. In FIG. 2, Table A represents an application-defined cell region, which supports an advanced data presentation method or technique sometimes referred to as "drilling down." Specifically, some of the cells within Table A can be selected, or "clicked" on (e.g., with a cursor control device, such as a mouse button), causing the table to be expanded (or collapsed) to show (or hide) additional data embedded within the cell region. As illustrated in FIG. 2, after a user has selected the cell in Table A with value "+Drink", Table A is expanded to present three additional columns. However, the expansion of Table A causes data in the cells of Table B to be overwritten with data from Table A. Here again, the cell properties, including formulas, of Table B may be broken.

SUMMARY

A render engine for a spreadsheet and methods for rendering cell regions within a spreadsheet interface are described. In some embodiments, the render engine facilitates the rendering of cell regions containing data that are maintained and managed by either a spreadsheet application (user-defined cell region) or a third-party application (application-defined cell region). In particular, some embodiments of the render engine facilitate the repositioning of one or more existing cell regions within a spreadsheet interface, when a command is being processed that will result in the insertion of a new cell region, and the insertion of the new cell region will cause a layout conflict with an existing cell region. The repositioning of the existing cell regions is achieved without overwriting any cell information, and without breaking any formulas contained within a cell of an affected cell region. Additionally, in some embodiments, a single cell movement strategy is selected from several cell movement strategies, based on a determination that the selected strategy meets some predefined criteria, such as, limiting the overall impact on the layout of existing cell regions.

Other aspects of the invention will become apparent from the detailed description that follows.

DESCRIPTION OF THE DRAWINGS

Some embodiments are illustrated by way of example and not limitation in the figures of the accompanying drawings, in which:

FIG. 2 is a before-and-after view of a spreadsheet application interface, illustrating an example of how cells may be overwritten when processing certain commands, such as a command that expands a portion of a cell region;

DETAILED DESCRIPTION

Figure 1:
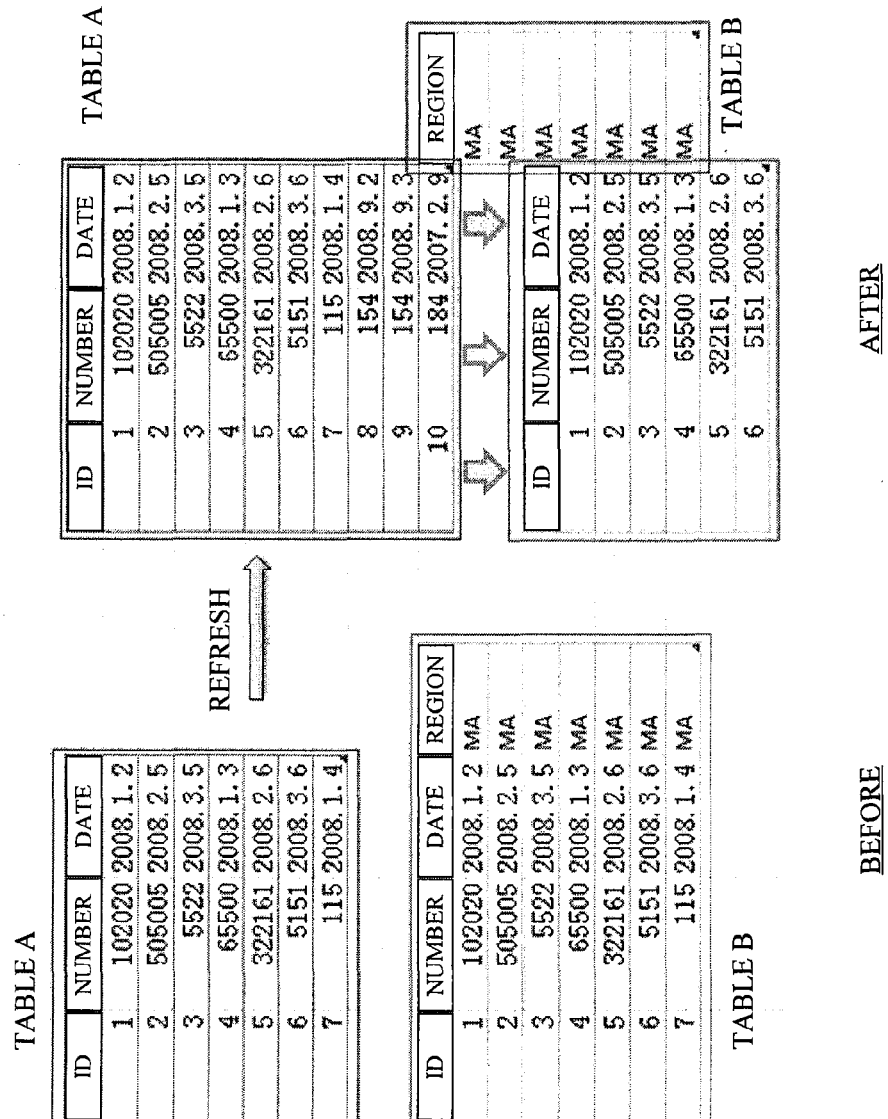
FIG. 1 is a before-and-after view of a spreadsheet application interface, illustrating an example of how cells may be overwritten when processing certain commands, such as a data refresh command.

Methods and systems for rendering data within a spreadsheet application are described. In the following description, for purposes of explanation, numerous specific details are set forth in order to provide a thorough understanding of example embodiments of the present invention. It will be evident, however, to one skilled in the art that the present invention may be practiced without these specific details.

Consistent with an embodiment of the invention, a render engine for use with a spreadsheet application is provided. The render engine facilitates methods that allow for cell regions (application-defined or user-defined) to be rendered (e.g., repositioned and displayed) upon detecting that the processing of certain commands will cause those cell regions to be overwritten. Because repositioning one cell region may require that one or more other cell regions be repositioned, in some embodiments the new offset position and the order of the cell region movements are computed to minimize the number of affected cell regions. In some embodiments, the render engine may be implemented to replace the spreadsheet application's native render engine. Alternatively, in some embodiments, the render engine may be implemented to work in conjunction with a spreadsheet application's native render engine. In some embodiments, the render engine may be implemented to work as an add-on (e.g., an extension, plug-in, or snap-in) to a spreadsheet application. Alternatively, in other embodiments, the render engine may be implemented as a native component of the spreadsheet application.

In the context of the present disclosure, a cell region is any group of cells which belong to the same entity or object and/or share in common the same data source. For instance, in some cases, all of the cells that make up an individual table are part of the same cell region. It is possible that a single cell may be considered a cell region.

In some embodiments, to avoid a layout conflict among various cell regions during the insertion of a new cell region, the process of repositioning one or more cell regions affected by the insertion of the new cell region, or the appending of new cells to an existing cell region, occurs in two phases. The first phase is a pre-processing or design time phase, during which the cell properties of all cell regions are read and a render engine data structure is generated to store the cell information for the cell regions. The render engine data structure is an intermediate storage structure used by the render engine for storing the cell properties of the cell regions for use in establishing, and ultimately processing or executing, a group of procedures for repositioning cell regions affected by the insertion of a new cell region.

The second phase, which can be referred to as the runtime phase, is itself a three stage or three step process. In the first stage of the second phase (i.e., the runtime phase), the states (e.g., positions) of the cell regions are analyzed to establish all possible combinations of cell region movements that are possible to avoid layout conflicts that would otherwise result from inserting the new cell region, or appending new cells to an existing cell region, in the spreadsheet. A cell region movement is referred to herein as a cell region repositioning operation, or simply, repositioning operation. A collection of repositioning operations that will yield the desired result—that is, no layout conflicts between an existing cell region and the new cell region being inserted, and no layout conflicts between any two existing cell regions—is referred to herein as a repositioning plan. In addition to indicating various repositioning operations, a cell region repositioning plan identifies the order in which the repositioning operations are to be executed or processed, and thus the order in which the cell regions are to be moved. Accordingly, the first stage of the second phase consists of identifying all unique repositioning plans yielding the desired result—no layout conflicts between cell regions.

In some embodiments, the output of the first stage is a decision tree. For example, in some embodiments, generating a plurality of repositioning plans for repositioning the existing cell regions of the spreadsheet includes generating a decision tree that has a root node representing the initial state of the spreadsheet with any layout conflicts that exist as a result of the new cell region being inserted. Each child node of the root node represents the state of the spreadsheet after an existing cell region has been moved (e.g., in accordance with a repositioning operation) to a new position to avoid a conflict with the new cell region. If the repositioning of an existing cell region causes a layout conflict with another existing cell region, then another repositioning operation is proposed, and a second level sibling node is generated to represent the repositioning of the existing cell region. This is continued until the repositioning of a cell region results in a spreadsheet state where no two cell regions have a layout conflict. Accordingly, each internal node of the decision tree represents the state of the spreadsheet after performing a repositioning operation to move one existing cell region from its original position to a new position. Each leaf node represents the state of the spreadsheet having no layout conflicts existing between the new cell region and another existing cell region, or any two existing cell regions, after having performed one or more cell movements in accordance with one or more repositioning operations. Finally, the path between the root node and each leaf node represents a unique repositioning plan indicating the cell movements that can be made to achieve the desired result—no layout conflicts between cell regions.

In the second stage of the second phase, a repositioning plan is selected from the several repositioning plans generated in the first phase. The repositioning plan selected includes a combination of cell movements (e.g., repositioning operations) that meets some predefined criteria. For instance, in some embodiments, the predefined criteria will be established to ensure that the repositioning of the cell regions has the least overall impact on the original cell region layout. The criteria for selecting the repositioning plan used to reposition the cell regions may vary from one embodiment to another, and some examples are described in greater detail below.

Finally, in the third stage of the second phase, the proposed repositioning operations of the selected repositioning plan are processed or executed, in the order specified by the repositioning plan, to effectuate the repositioning of the affected cell regions, and the new cell region is inserted. In some embodiments, a render engine data structure is utilized to remap the cell references of the affected cell regions to their new cell references, without breaking any formulas or other cell properties associated with a cell of an affected cell region. Accordingly, if a cell in the spreadsheet is associated with a formula that references a cell that is being repositioned, the formula is updated to reflect the new cell reference of the repositioned cell.

Figure 3:
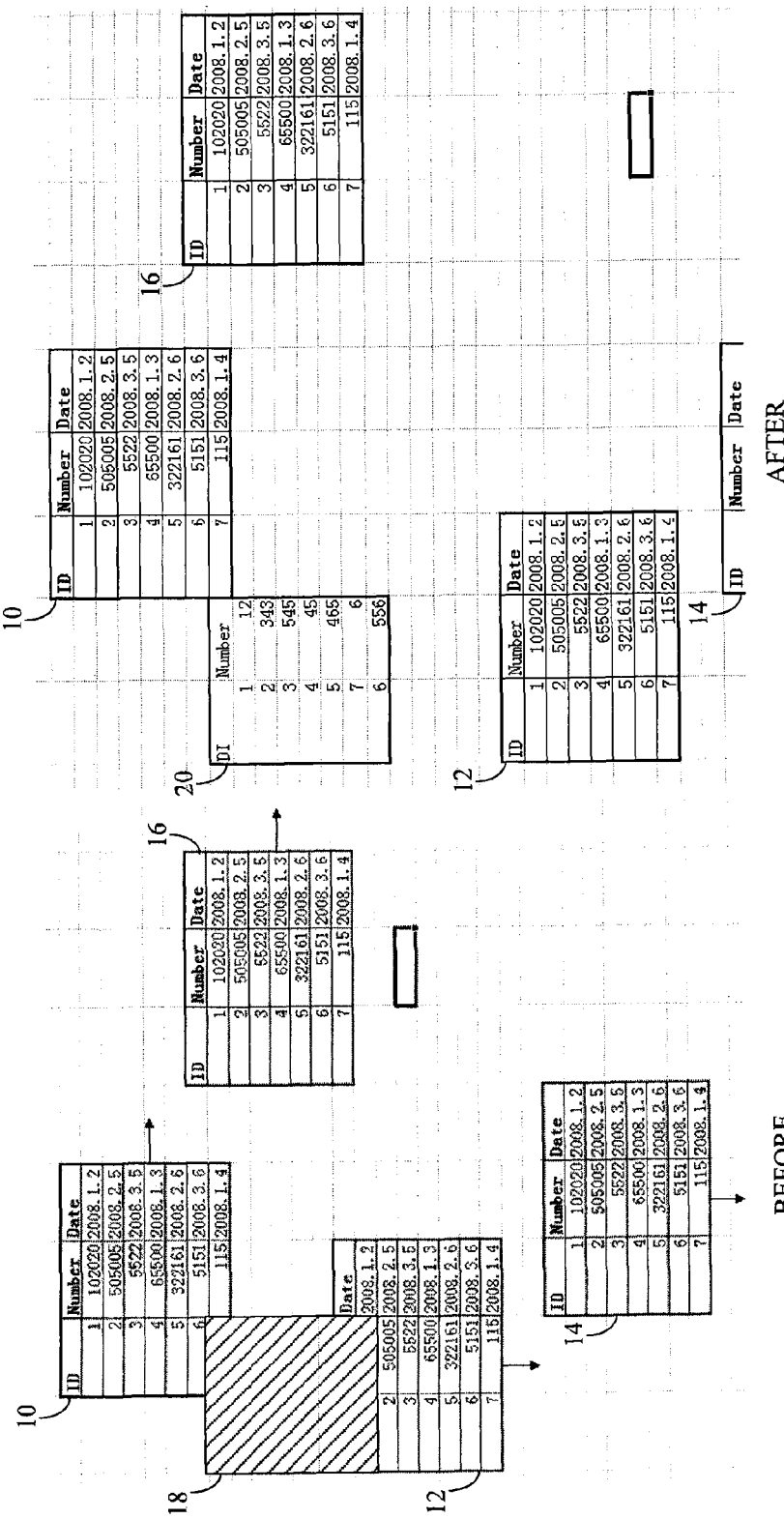
FIG. 3 is a before-and-after view of a spreadsheet application interface illustrating an example of how cell regions are repositioned, in accordance with an embodiment of the invention, when processing a command, such as a data insertion command, that will result in the insertion of a new cell region causing a layout conflict with at least one existing cell region.

FIG. 3 is a before-and-after view of a spreadsheet application interface illustrating an example of how cell regions are repositioned upon processing a data insertion command, according to an embodiment of the invention. As illustrated in the left portion (i.e., the BEFORE view) of FIG. 3, there are four existing cell regions, each consisting of a well formed table (e.g., tables 10, 12, 14 and 16). The box with reference 18 represents a cell region selected as a target location where a new cell region (e.g., a table) is to be inserted. From the overlapping portions of box 18 with tables 10 and 12, it can be seen that a layout conflict exists. Specifically, if the new table is inserted in the cell region defined by box 18, the lower and left most cell of table 10 will be overwritten, as will four cells in the upper left most portion of table 12. Each of tables 10, 12, 14 and 16 includes an arrow indicating the direction each table is to be moved when being repositioned to accommodate the insertion of the new table, as determined by the render engine.

In the right portion (i.e., the AFTER view) of FIG. 3, the tables 10, 12, 14 and 16 are shown in their new positions, after having been processed and rendered by the render engine, upon inserting the new table 20 in the cell region defined by box 18 (in the BEFORE view). As illustrated in FIG. 3, the tables 10, 12, 14 and 16 have been repositioned to accommodate table 20, while generally preserving the layout of the document and without overwriting any cell properties or breaking any formulas.

Figure 4:
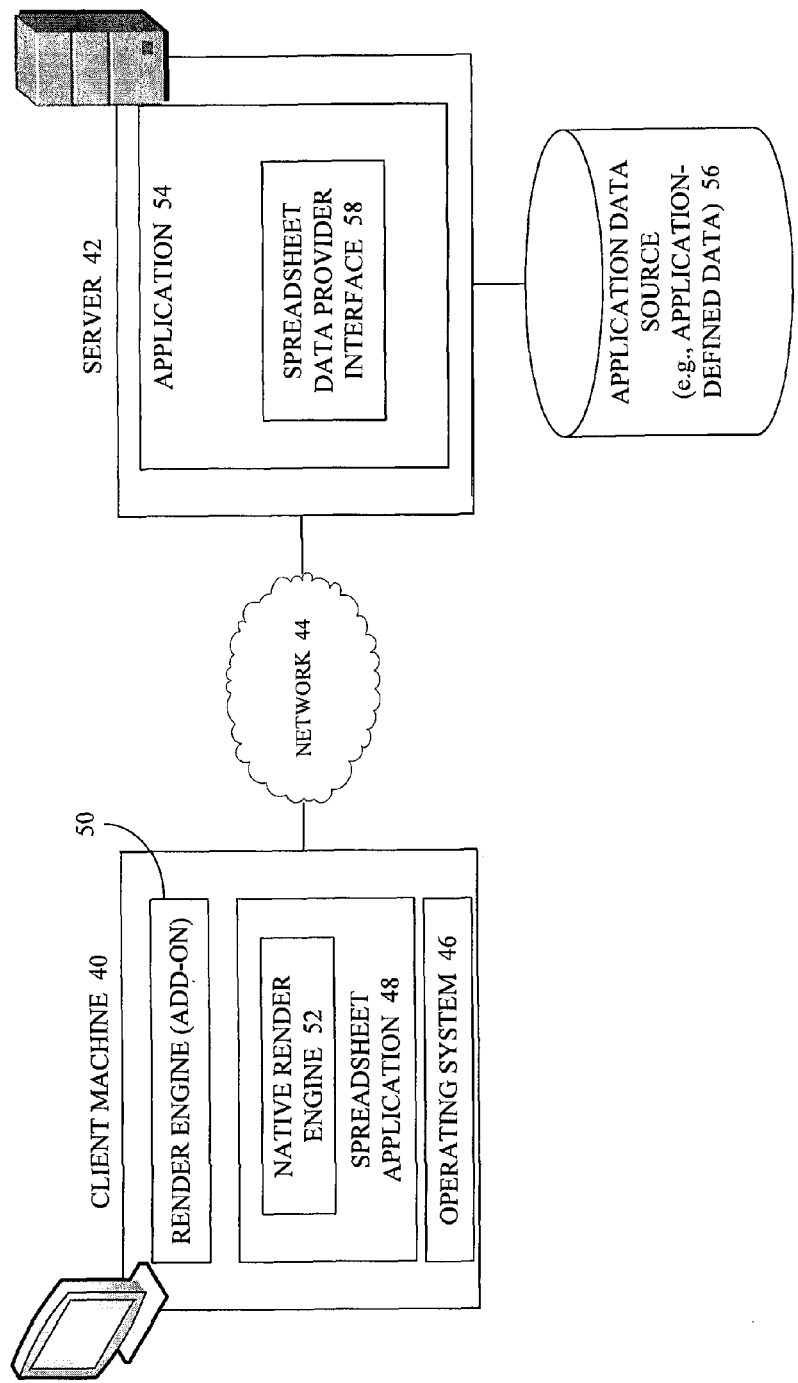
FIG. 4 is a block diagram illustrating the functional components of a client-server system, including a client-based spreadsheet application implemented to use a render engine as an add-on component to present application data maintained and managed by an application residing and executing on a server machine, according to an embodiment of the invention.

FIG. 4 illustrates a block diagram of the functional components of a client-server system, which includes a client-based spreadsheet application 48 implemented to use a render engine 50 as an add-on component for presenting application data 56 maintained and managed by an application 54 residing and executing on a server machine 42, according to an embodiment of the invention. As illustrated in FIG. 4, a client machine 40 is shown to be communicatively coupled to a server machine 42 by means of a network 44. The client machine 40 includes an operating system 46 and a spreadsheet application 48. In this example, the spreadsheet application 48 is configured to utilize a render engine 50, consistent with an embodiment of the invention, as an add-on component. The add-on render engine 50 is configured to operate in conjunction with the spreadsheet application's native render engine 52. Accordingly, some commands or instructions will automatically invoke, and be processed by, the add-on render engine 50, while some commands and instructions will invoke, and be processed by, the native render engine 52. For example, when the render engine 50 is used in conjunction with the spreadsheet application's native render engine 52, the render engine 50 may be utilized in the processing of a select set of commands or instructions that facilitate the rendering of cell regions containing and/or displaying data read from a data source 56 maintained and managed by a third-party application 54.

In FIG. 4, the server machine 42 includes an application 54 and an application data source 54. The application 54 is shown to include a spreadsheet data provider interface 58. Accordingly, in some embodiments, the spreadsheet data provider interface 58 serves as a mechanism by which the application 54 causes application data from the application data source 56 to be presented by the spreadsheet application 48. The application 54 residing and executing at the server 42 may provide the spreadsheet application 48 with enhanced data processing and presentation functionality. For instance, as briefly noted above, the application 54 residing on the server 42 may facilitate the presentation of interactive data, enabling a user to "drill down" to expose, or hide, additional data by selecting certain cells in a cell region. In some embodiments, the spreadsheet data provider interface 58 may be associated with or implemented based on an application programming interface. The application 54, in some embodiments, may periodically and automatically communicate a command and data to the spreadsheet application 48 to update a data set associated with a cell region of the spreadsheet application's displayed spreadsheet interface. Some examples of specific third-party applications that may be utilized on the server side include, but are certainly not limited to, LIVE OFFICE, VOYAGER and/or EXPLORER, developed by and available from SAP AG.

Figure 5:
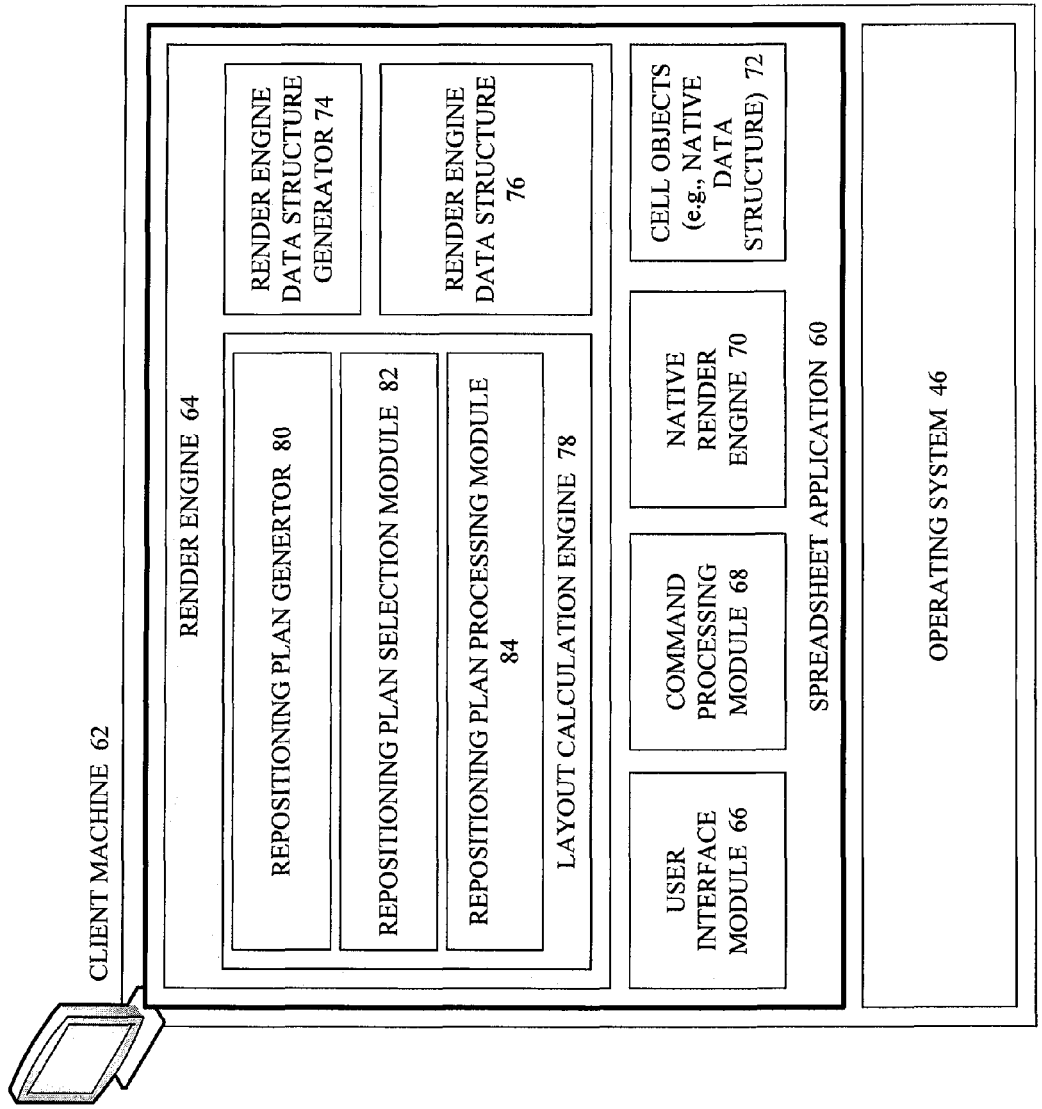
FIG. 5 is a block diagram illustrating the functional components of a spreadsheet application with a render engine, consistent with an embodiment of the invention, residing on a client-machine.

FIG. 5 is a functional block diagram of a spreadsheet application 60, residing on a client machine 62, with a render engine 64 that is consistent with an embodiment of the invention. In this particular example, the render engine 64 is implemented not as an add-on, but as an actual component of the spreadsheet application 60. Accordingly, in addition to the render engine 64, the spreadsheet application 60 includes a user interface module 66, a command processing module 68, a native render engine 70 and cell objects 72.

As its name suggests, the user interface module 66 serves as an interface between the spreadsheet application and a user of the spreadsheet application. For example, the user interface module 66 facilitates the receiving and processing of user input. In some embodiments, the user interface module 66 may operate in close conjunction with a user interface component included in the operating system 46. In addition, the user interface module 66 may operate in conjunction with the render engine 64 and/or the native render engine 70 to facilitate displaying data via a graphical user interface.

The command processing module 68 receives and processes commands. For example, when a user selects a command from a drop-down menu, the selection of the command will be processed by the command processing module 68. In addition, commands may be received from third-party applications. In particular, a third-party application may communicate a data insertion or data refresh command to the spreadsheet application, which affects the layout of one or more existing cell regions. In some embodiments, the command processing module 68 may determine that a command is to be processed by the render engine 64, or the native render engine 70. Accordingly, the command processing module 68 will, upon receiving a command, identify the appropriate process (e.g., function, instructions or sub-routine) for processing the received or requested command.

In some embodiments, the spreadsheet application 60 stores cell information such as cell references and associated cell properties within an internally managed data structure or data structures—such data structures referred to herein as cell objects 72. For instance, when a spreadsheet document is first opened, the data in the document may be read and stored in the cell objects 72. Accordingly, when, as a result of processing a command, the cell properties of a particular cell are manipulated, the cell properties may be read from, processed, and written to a cell object for the particular cell. As described in greater detail below, certain commands that result in the repositioning of one or more cell regions are first processed via an intermediary storage structure (e.g., the render engine data structure 76), prior to the data being serialized with the spreadsheet application's native cell storage structures, for example, the cell object or objects 72. The process of serializing cell information involves updating (e.g., writing to) cell information to the spreadsheet application's native cell storage structures, for example, cell objects 72.

The render engine 64 includes a render engine data structure generator 74 for generating a render engine data structure 76. In general, the render engine data structure generator 74 performs the pre-processing or design time phase of the process for repositioning cell regions. The render engine data structure generator 74 generates the render engine data structure 76, which is used as an intermediary storage structure for storing cell references and the corresponding cell properties of cell regions when those cell regions are being processed for the purpose of repositioning the cell regions. Accordingly, the data structure generator 74 generates the render engine data structure 76 by reading cell properties from the spreadsheet application's native storage structure for cells (e.g., the cell objects 72) or from an external data source associated with a third-party application. In some embodiments, the render engine data structure 76 is generated when a spreadsheet document is first opened. For example, the opening of a spreadsheet document may trigger the render engine data structure generator 74 to read the relevant cell references and cell properties from the cell objects 72 and external data sources, and store the relevant information in the render engine data structure 76. In other embodiments, other events may trigger the generation of the render engine data structure 76.

The layout calculation engine 78 performs the processing required for repositioning one or more cell regions, when the processing of a data insertion or data refresh command would otherwise result in a layout conflict. Accordingly, the layout calculation engine 78 performs the three stages or steps involved in the second phase (e.g., the runtime phase) of the process for repositioning cell regions. The layout calculation engine 78 includes a repositioning plan generator 80, a repositioning plan selection module 82, and a repositioning plan processing module 84.

As indicated above, in some embodiments, the procedure for repositioning one or more cell regions to avoid a layout conflict consists of three phases. The first phase, performed by the repositioning plan generator 80, involves identifying all strategies that might be utilized to reposition those cell regions affected by the insertion of a new cell region, or appending new cells to an existing cell region. In this case, each strategy represents a unique group of cell movements and order of cell movements, and is embodied in a repositioning plan. Because the repositioning of one cell region may cause a layout conflict with another cell region, the process of identifying layout conflicts must be repeated after every proposed cell region movement is determined until no layout conflicts exist. The repositioning plan generator 80 receives as input, the position and size of the new cell region to be inserted, and provides as output several repositioning plans, each consisting of a group of repositioning operations to be executed in a particular order to avoid any layout conflicts. As described in greater detail below, in one embodiment, generating the repositioning plans involves generating a decision tree, such that the path between the root node and each leaf node of the decision tree represents a unique repositioning plan.

The repositioning plan selection module 82 performs the second phase or step by selecting for execution a single repositioning plan from all of the repositioning plans generated by the plan generator 80 in the first phase or step. The selection of the repositioning plan to be executed is based on the selected plan satisfying some predefined criteria. For instance, in some embodiments, the repositioning plan that has the least impact on the initial layout of the cell regions is selected. For instance, if one repositioning plan requires that three cell regions be repositioned, while another repositioning plan requires that only two cell regions be repositioned, then the plan with fewer cell region movements may be selected. In other embodiments, the number of cells affected and the distance those cells must be moved from their original position may be considered when determining which of several repositioning plans to select for execution. As described in greater detail below, in some embodiments, selecting the repositioning plan includes traversing a decision tree to identify a repositioning plan represented by the path from the root node of the tree to a leaf node of the tree.

In any case, once a repositioning plan has been selected, in the third phase, the repositioning plan processing module 84 executes the various repositioning operations of the selected repositioning plan. The repositioning operations are processed in an order as indicated by the repositioning plan. For example, in the case where the repositioning plan is represented in the form of a decision tree, the repositioning operations are associated with nodes of the tree, and are processed in reverse order, for example, leading from a leaf node to the root node. In other embodiments, the order of the repositioning operations may simply be indicated by a number. Once each cell region has been repositioned, in accordance with a repositioning operation of the repositioning plan, the new cell region can be inserted into the spreadsheet. To effectuate the repositioning of each cell region, the repositioning processing module manipulates the cell references and/or cell properties stored in the render engine data structure 76. For instance, to move a cell region from one position to another, the cell properties associated with the initial cell references must be reassigned to the cell references representing the cells of the new position for the cell region. In some embodiments, this cell information processing is initially accomplished using the render engine data structure 76. Once each repositioning operation has been processed, and the underlying cell data structures have been updated to reflect the movement of each cell region, the cell information in the render engine data structure 76 is serialized with the cell objects 72. For example, the cell information in the render engine data structure 76 is written to the appropriate cell object 72 of the spreadsheet application.

Figure 6:
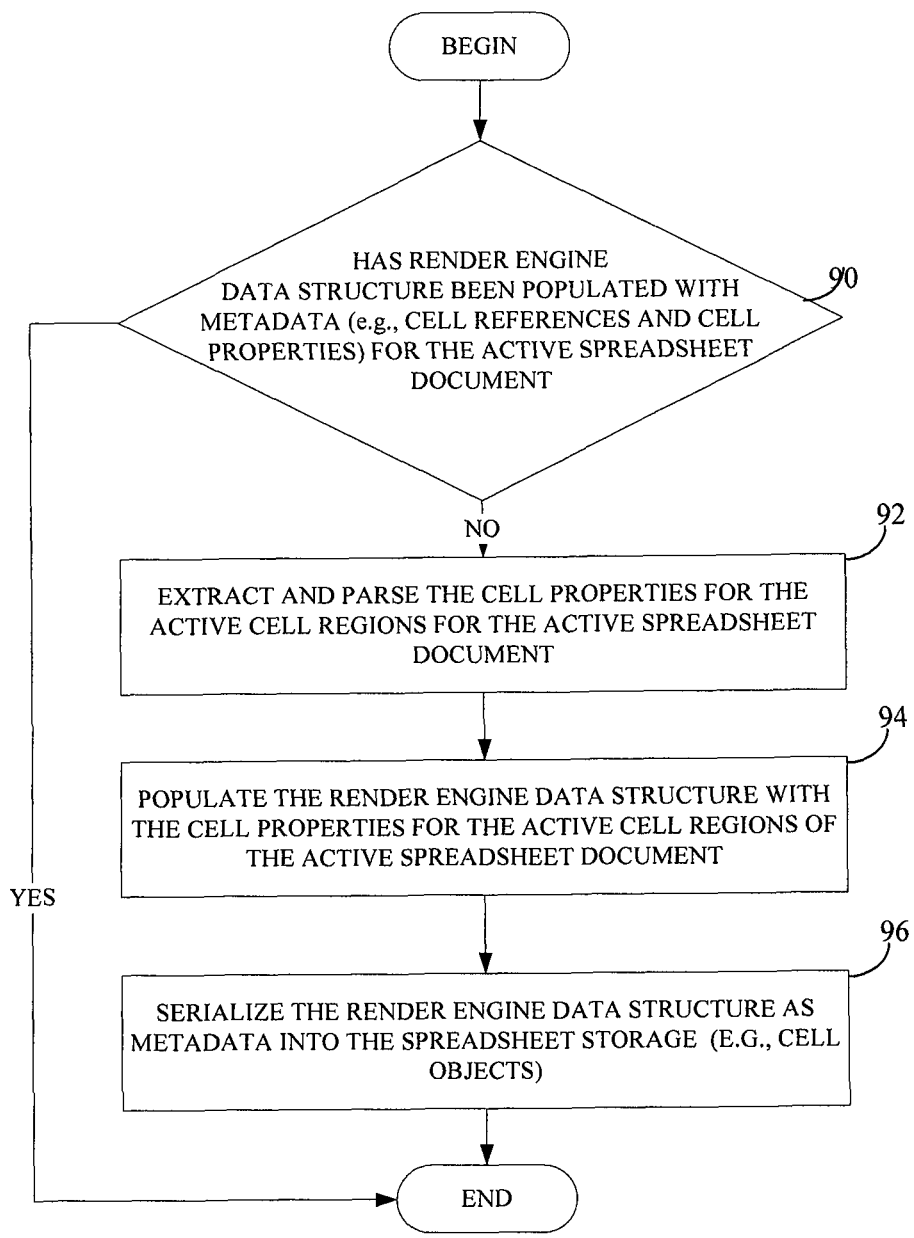
FIG. 6 is a flow diagram illustrating the method operations involved in a method, according to an embodiment of the invention, for generating a data structure for use in repositioning one or more cell regions whose layouts are affected by the insertion of a new cell region, or the appending of new cells to an existing cell region.

FIG. 6 illustrates a method, according to an embodiment of the invention, for generating a render engine data structure 76 for use in repositioning one or more cell regions having a layout affected by the insertion of a new cell region, or the appending of new cells to an existing cell region. The method operations illustrated in FIG. 6 are associated with the initial pre-processing, or design time, phase. The method begins at method operation 90 when an event is detected that causes the render engine to determine whether the render engine data structure 76 has been populated with cell information (e.g., cell references and cell properties) for the active spreadsheet document. In some embodiments, the triggering event will be the opening of the spreadsheet document. However, in alternative embodiments, other events may trigger the generation of the render engine data structure 76. For example, in some embodiments a user may elect to manually initiate the generation of the render engine data structure 76. In any case, if the render engine data structure 76 has already been generated for the active spreadsheet document, no further operations are required. However, if the render engine data structure 76 for the active spreadsheet document has not yet been generated, at method operation 92 the render engine data structure generator 74 extracts and parses the relevant cell information for the active cell regions for the active spreadsheet document. The metadata or cell information extracted describes or includes the cell properties for the active cell regions including layout information (e.g., a cell reference, such as a row and column, to identify the position of a cell region) and cell region size information (e.g., a number of rows and columns included in the cell region.) The cell information extracted and parsed during method operation 92 may be maintained by the spreadsheet application, or alternatively, may be maintained and managed by a third-party application. The metadata or cell information may also include, but is certainly not limited to, formulas, and pivot table information, and other location-sensitive properties which are bound to the cell.

Next, at method operation 94 the render engine data structure 76 is populated with the cell information for the active cell regions of the active spreadsheet document. Finally, at method operation 96, the cell information in the render engine data structure 76 is serialized (e.g., written) into the spreadsheet application's native cell storage structures (e.g., cell objects 72). This ensures that the render engine data structure 76 corresponds with the spreadsheet application's internal representation of the active cell regions.

Figure 7:
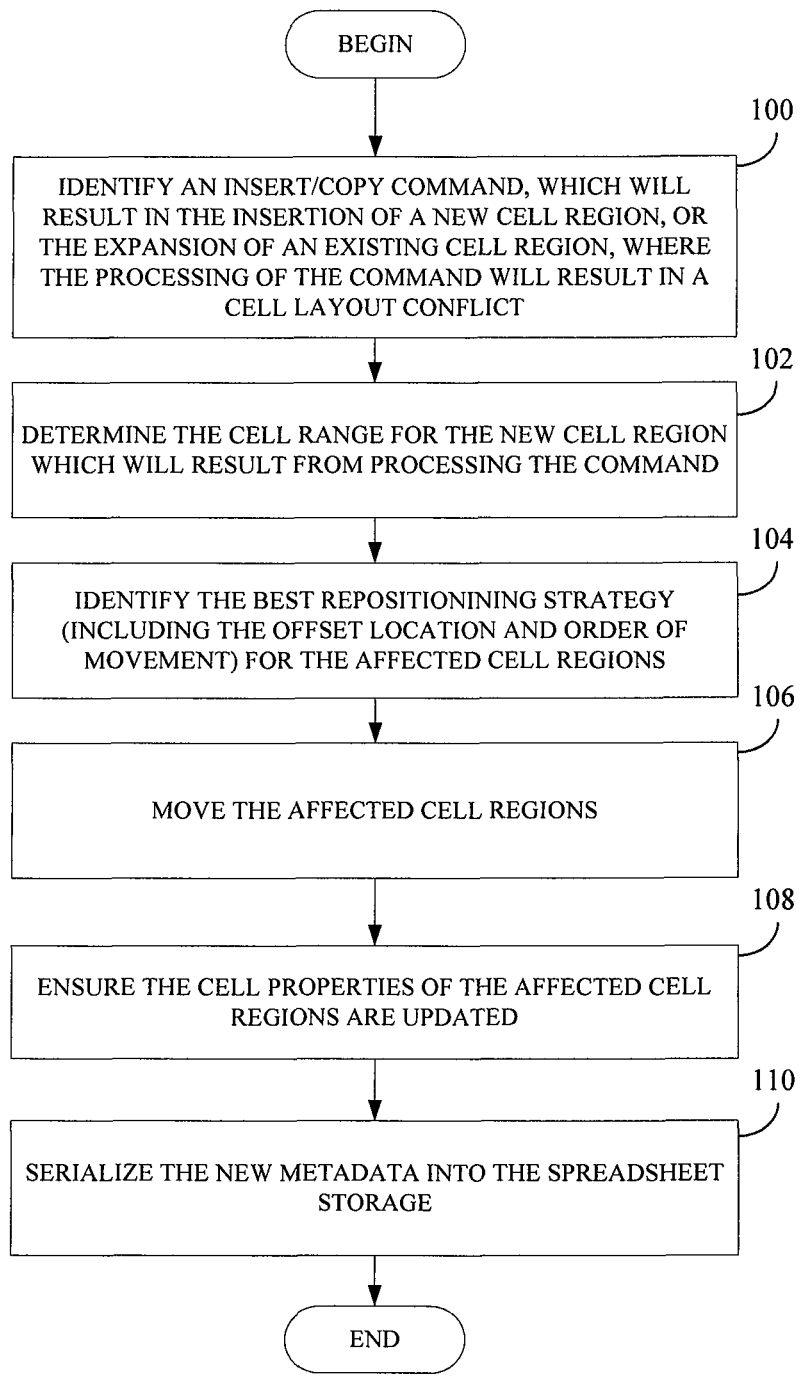
FIGS. 7 and 8 are flow diagrams illustrating the method operations involved in aspects of methods, according to certain embodiments of the invention, for repositioning cell regions within a spreadsheet interface that are affected by the insertion of a new cell region, or the appendage of new cells to an existing cell region.

FIG. 7 illustrates a method, according to an embodiment of the invention, for repositioning one or more cell regions whose layouts are affected by the insertion of a new cell region, or the appending of new cells to an existing cell region. At method operation 100 a data insertion or data refresh command, which will result in the insertion of a new cell region, or the expansion of an existing cell region, is identified. In some embodiments, the identified command is one which will potentially result in a cell layout conflict between an application-defined cell region and a user-defined cell region.

At method operation 102, the cell range (e.g., position and size) for the new cell region to be inserted, which will result from the processing of the command identified at method operation 100, is determined. In some cases, the new cell region will represent an entirely new data entity, such as a table. In other cases, the insertion of a new cell region involves the expansion of an existing cell region, for example, as part of a data refresh command, or as part of a command that expands a portion of an existing cell region to display additional data.

Next at method operation 104, the optimal repositioning strategy is identified. In some embodiments, this involves identifying several repositioning plans, each consisting of several steps or moves for repositioning a particular cell region, and then selecting the plan that has the least impact on the layout of the affected cell regions. A more detailed example of the various steps or operations involved with method operation 104 is provided and described in connection with FIG. 8.

At method operation 106, after identifying the best strategy or plan for repositioning the affected cell regions, the individual steps (e.g., repositioning operations) associated with the best strategy or plan are executed to reposition the affected cell regions. Repositioning a cell region in accordance with a cell repositioning operation may include, for example, calculating for each cell a new cell reference based on an offset that indicates both a cell movement direction and distance (e.g., measured in rows or columns.) At method operation 108, a process is performed to ensure that the cell properties of the affected cell regions are updated, for example, to accurately reflect any cell references included in formulas, in view of a cell region being repositioned. For example, if a cell that is being repositioned is referenced in the formula of another cell (in the same or a different cell region), the cell reference in the formula is updated to reflect the new cell reference of the cell that is being repositioned. Accordingly, in some embodiments, each time a cell of a cell region is moved, a check is done to determine if the cell is referenced in a formula of any other cell. If so, the formula is updated to reflect the repositioning of the cell. As a cell region may be moved multiple times, a cell containing a formula that references another cell may need to be updated several times in the course of processing the various repositioning operations that make up the repositioning plan.

Finally, at method operation 110 the cell information corresponding to the new positions of each affected cell region are serialized with the spreadsheet application's native cell storage structures (e.g., cell objects 72 in FIG. 5.) In some embodiments, the visual representation of the cells is changed only at the point when the cell information in the spreadsheet application's native cell structures is modified or updated. In addition, in some embodiments, when the cell information is serialized with the spreadsheet application's native cell storage structures, a verification process may be performed to ensure that no formulas have been broken as a result of repositioning the affected cell regions.

Figure 8:
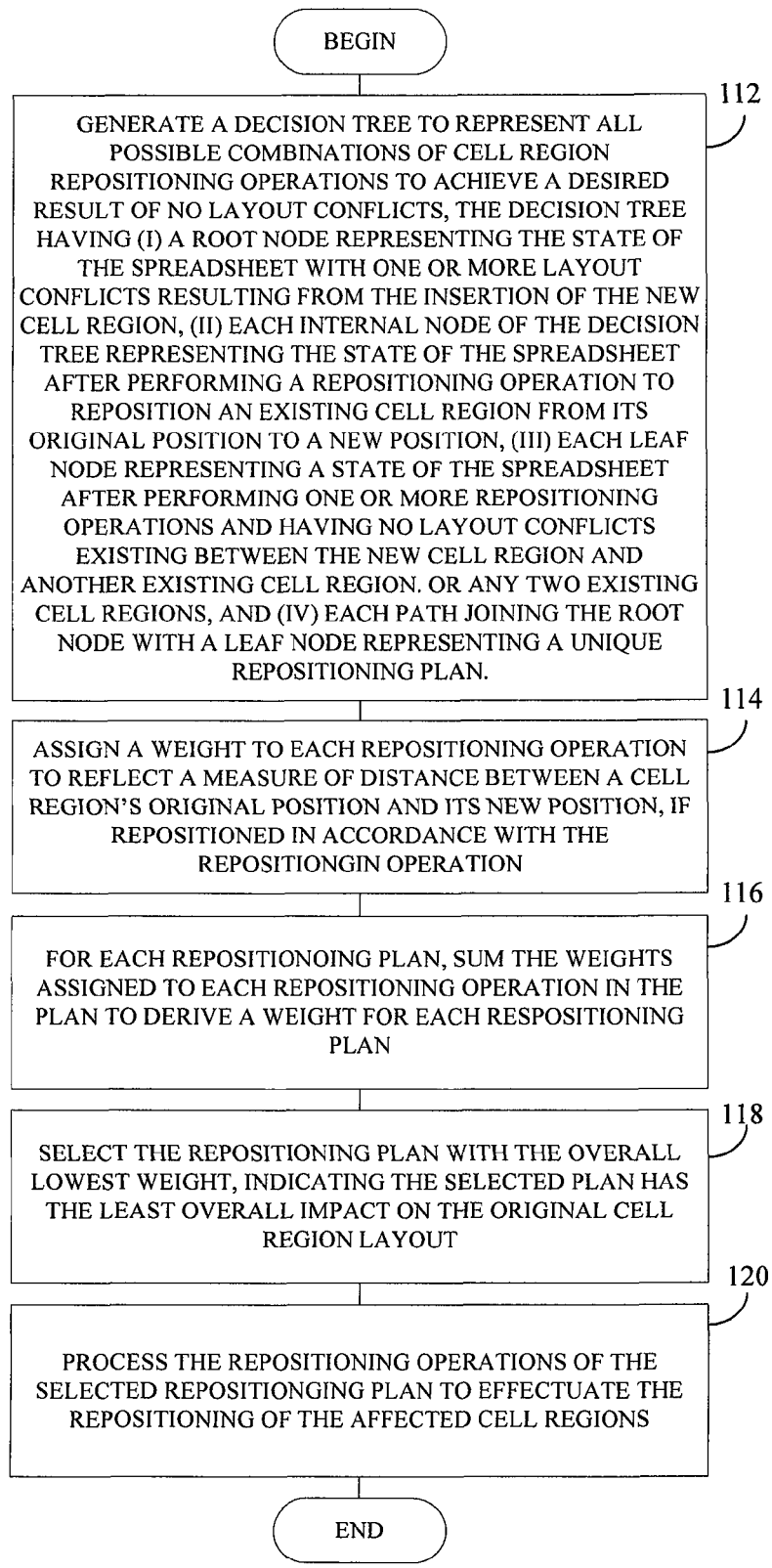
Figure 9:
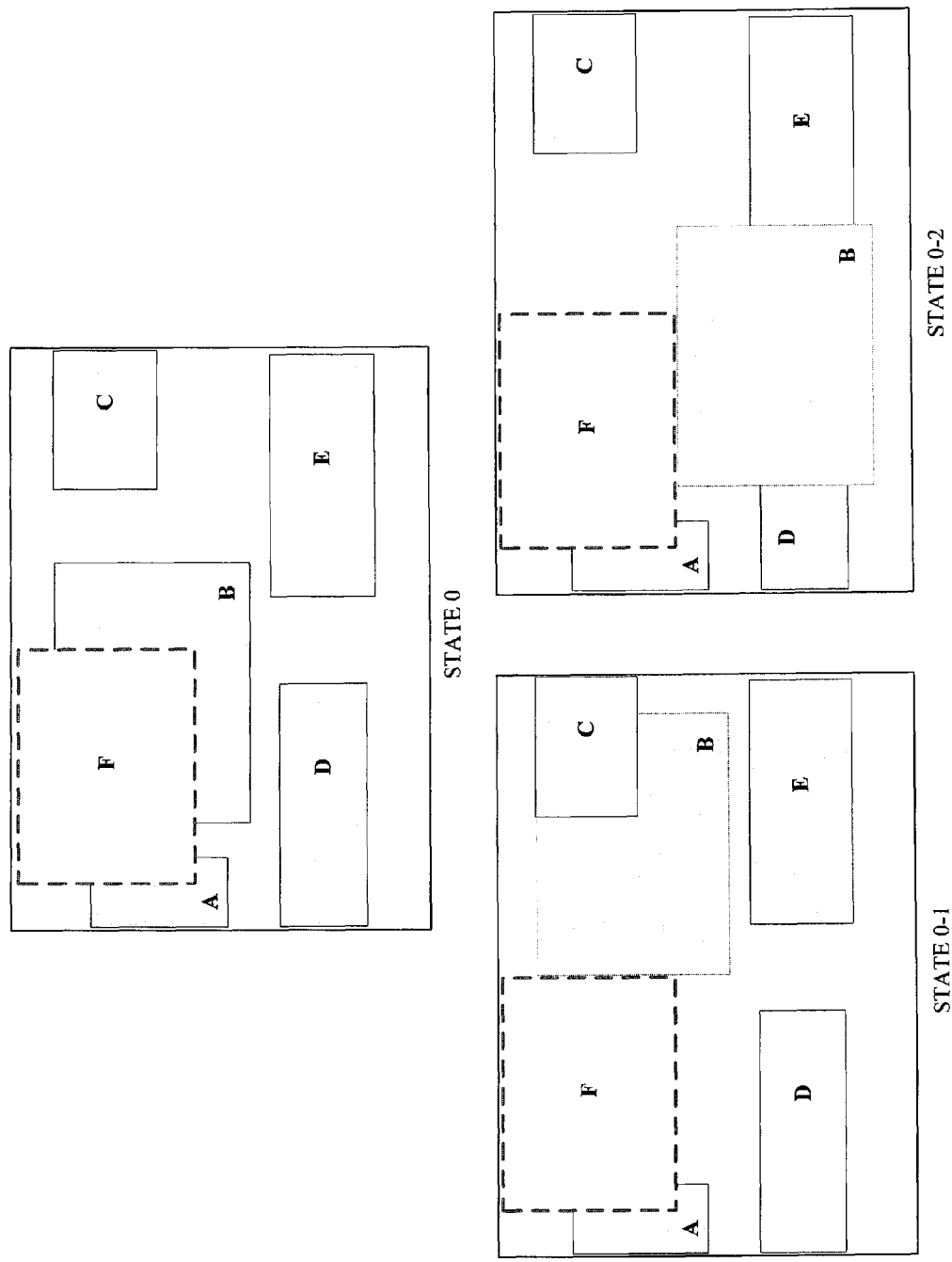
FIG. 9 is a block diagram illustrating examples of various cell region movements or repositioning operations for use with a repositioning plan, according to an embodiment of the invention.
Figure 10:
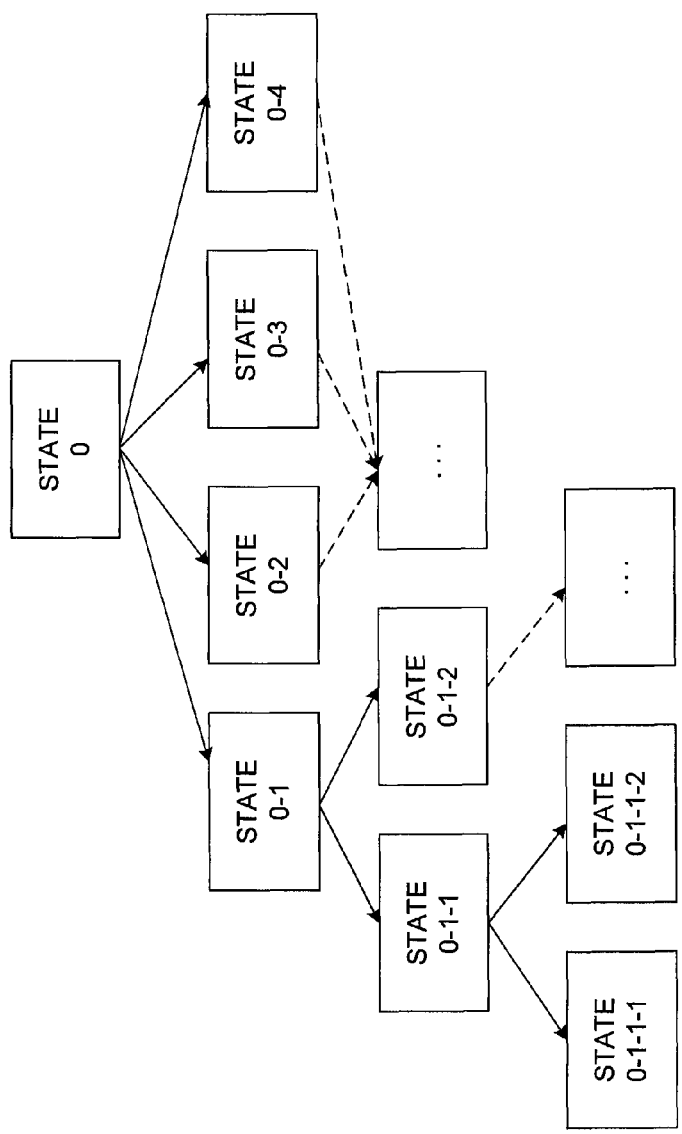
FIG. 10 is a block diagram of a decision tree representing various states of a spreadsheet interface, and various cell region repositioning plans corresponding to the states, according to an embodiment of the invention.

FIG. 8 is a flow diagram illustrating the method operations involved in a method, according to one embodiment of the invention, for generating a decision tree to represent the various repositioning operations that make up repositioning plans for use in repositioning cell regions to avoid layout conflicts. In some embodiments, identifying the best strategy for repositioning the cell regions affected by the insertion of a new cell region, with minimal impact to the existing layout of the existing cell regions, involves generating a decision tree. Accordingly, in FIG. 8, the method begins when, at method operation 112, a decision tree is generated. For example, in some embodiments, generating a plurality of repositioning plans for repositioning the existing cell regions of the spreadsheet includes generating a decision tree that has a root node representing the initial state of the spreadsheet with any layout conflicts that exist as a result of the new cell region being inserted. As illustrated in FIGS. 9 and 10, this initial state of the spreadsheet interface is represented by the root node, and is referred to as State 0.

Beginning from this initial state, State 0, a recursive approach is undertaken to enumerate all possible combinations of cell region movements (e.g., repositioning operations) based on the given initial state. For instance, referring again to the box labelled "State 0" in FIG. 9, there are five existing cell regions, A, B, C, D and E, and the user or an application is going to insert a new cell region, cell region F, in the position indicated by the box with reference letter "F". Cell regions A and B are then detected to be affected by the insertion of cell region F, so the render engine needs to move the affected cell regions into another position to avoid having those cell regions overwritten by cell region F.

Under this scenario, there are a few options for moving the affected cell regions. For example, cell region B could be shifted to the right by an offset to make enough space for the insertion of cell region F, without having cell region F overwrite the cells of cell region B when inserted. In FIG. 9, the box with label "State 0-1" represents this option, and cell region B is shown in its new location, shifted to the right. Note that now cell region C is affected by the movement of cell region B, and another cell region movement or repositioning operation will be required. Instead of shifting cell region B to the right, cell region B could also be shifted down to avoid having cells in cell region B overwritten when cell region F is inserted. In FIGS. 9 and 10, this option is indicated by the box with label, "STATE 0-2." Note, as illustrated in the box with label, "STATE 0-2" in FIG. 9, shifting cell region B down causes a layout conflict between cell region B and cell regions D and E. Thus, at least two additional cell region movements or repositioning operations will be required.

The process outlined above is recursively repeated until there are no layout conflicts that exist between any two cell regions. For instance, after every possible cell region repositioning operation, the process is repeated for any new layout conflict that exists as a result of moving a cell region. The result of the process is a decision tree as illustrated in FIG. 10. Accordingly, each child node of the root node of the decision tree represents the state of the spreadsheet after an existing cell region has been moved (e.g., in accordance with a repositioning operation) to a new position to avoid a conflict with the new cell region being inserted. If the repositioning of an existing cell region causes a layout conflict with another existing cell region, such as the layout conflict that exists between cell region B and cell region C in the box labelled, "State 0-1" in FIG. 9, then another repositioning operation is proposed, and a second level sibling node is generated to represent the repositioning of the existing cell region. This is continued until the repositioning of a cell region results in a spreadsheet state where no two cell regions have a layout conflict. Therefore, each internal node of the decision tree represents the state of the spreadsheet after performing a repositioning operation to move one existing cell region from its original position to a new position. Each leaf node represents the state of the spreadsheet having no layout conflicts existing between the new cell region and another existing cell region, or any two existing cell regions, after having performed one or more cell movements in accordance with one or more repositioning operations. Finally, by associating a repositioning operation with each node, the path between the root node and each leaf node represents a unique set of cell movements that will result in no layout conflicts. Such a combination of cell movements or repositioning operations is referred to herein as a repositioning plan.

Referring again to FIG. 8, after a decision tree has been generated, a weight may be assigned to each repositioning operation based on the distance between a cell region's initial position and the cell region's new position that results from moving the cell region in accordance with a repositioning operation. For example, the distance may simply reflect the number of columns or rows that the cell region is shifted. Alternatively, the weight assigned to the repositioning operation may take into consideration the size of the cell region being repositioned. For instance, the distance may be multiplied by the number of cells (rows and columns) in the cell region, such that the weight assigned to the repositioning operation reflects, to some extent, the size of the cell region being repositioned. Accordingly, if a larger cell region is being repositioned, its greater impact on the overall layout of the spreadsheet interface will be reflected in the weight assigned to the cell region repositioning operation for moving that particular cell region.

After each repositioning operation has been assigned a weight, at method operation 116, the sum of the weights for each repositioning operation in a particular repositioning plan are determined to derive an overall weight for each repositioning plan. Next, at method operation 118, the repositioning plan with the lowest weight, reflecting the lowest overall impact to the existing layout of a spreadsheet interface, is selected. Finally, at method operation 120, the repositioning operations of the selected repositioning plan are carried out. The repositioning operations are processed in reverse order, with the repositioning operation associated with the leaf node being processed first. For example, with the decision tree illustrated in FIG. 10, the repositioning operation associated with the node labelled, "STATE 0-1-1-1" might be processed, followed by the repositioning operation associated with the node labelled, "STATE 0-1-1," and so on, until finally, there is space for the new cell region to be inserted, without causing any layout conflicts between cell regions. In some embodiments, the processing of the repositioning operations is accomplished by first processing the cell information as it is stored in the render engine data structure 76 (FIG. 5), and then, once the cell information has been updated in the render engine data structure 76 to reflect the relocation of the cell regions, the cell information in the render engine data structure 76 is written to the spreadsheet application's native cell storage structures, for example, the cell objects 72.

It will be appreciated that the method operations of the methods illustrated herein and described above may be altered to a certain degree without departing from the spirit of the invention. For example, in some embodiments, the distinct method operations illustrated herein may be combined in some manner. Additionally, one or more of the method operations may occur in an order different from what is proposed herein. For example, with regard to the method of FIG. 8, method operation 114 may occur as a sub-step of method operation 112, such that, as each repositioning operation is identified, the weight associated with the repositioning operations is also determined.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, processes, applications or generators (e.g., repositioning plan generator 80) that operate to perform one or more operations or functions. The modules, engines, processes, applications and generators referred to herein may, in some example embodiments, comprise processor-implemented modules, engines, processes, applications and generators.

Similarly, the methods described herein may be at least partially processor-implemented. For example, at least some of the operations of a method may be performed by one or more processors or processor-implemented modules, engines, processes, applications and generators. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 11:
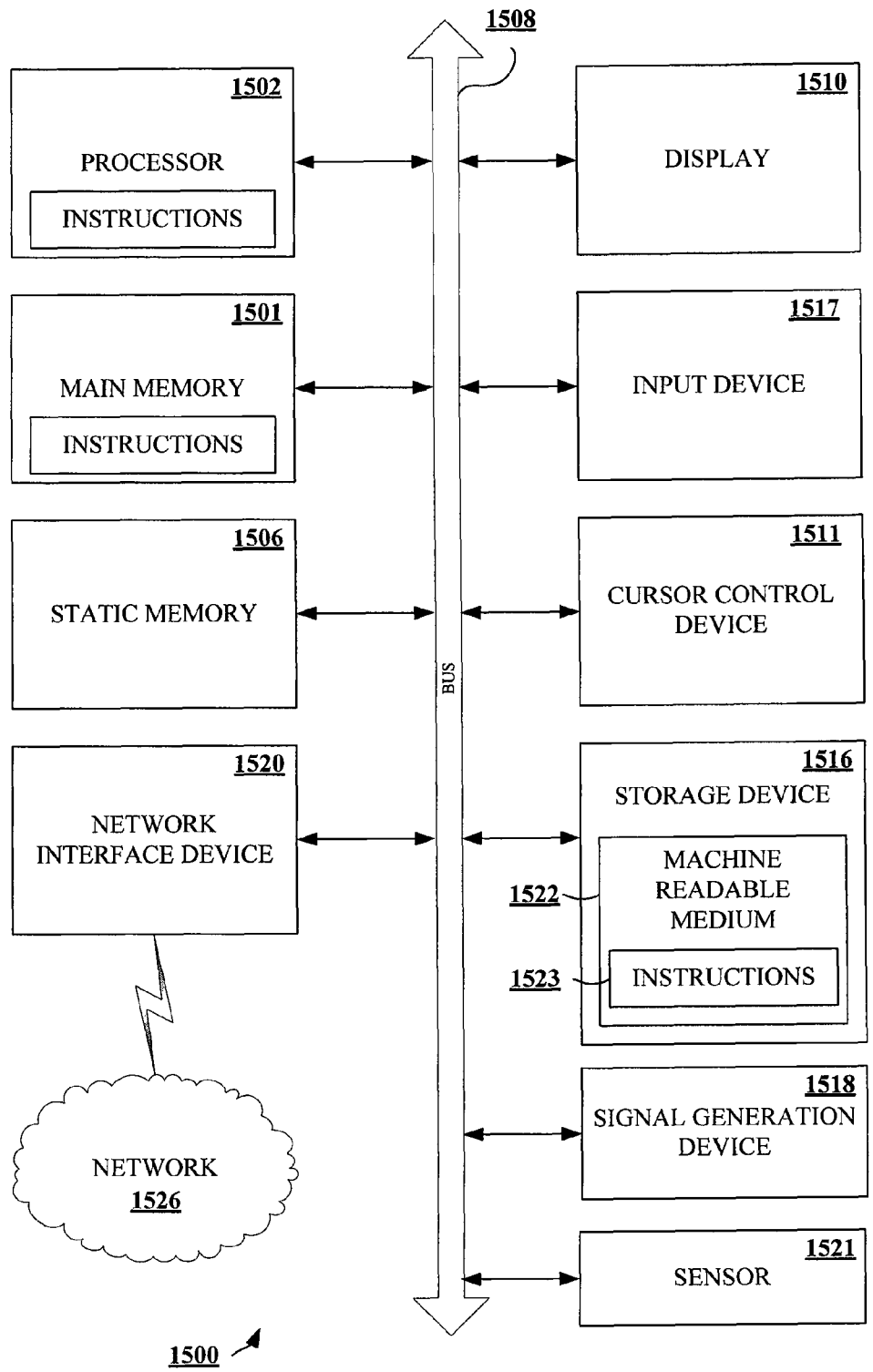
FIG. 11 is a block diagram of a machine in the form of a computing device within which a set of instructions, for causing the machine to perform any one or more of the methodologies discussed herein, may be executed.

FIG. 11 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A processor-implemented method for processing a command to insert a new cell region into a spreadsheet, the method comprising:
   determining that the processing of the command requires that one or more existing cell regions of the spreadsheet be repositioned to avoid a layout conflict between the one or more existing cell regions and the new cell region, wherein a cell region is a group of cells belonging to the same entity or object, or, sharing in common the same data source;
   subsequent to determining that the processing of the command requires that one or more existing cell regions of the spreadsheet be repositioned, generating a plurality of repositioning plans for repositioning one or more existing cell regions of the spreadsheet in a manner that will avoid a layout conflict, each repositioning plan specifying a unique combination of repositioning operations and an order for performing the repositioning operations, each repositioning operation specifying a proposed movement of at least one cell region of the one or more existing cell regions from its current position to a new position;
   subsequent to generating the plurality of repositioning plans, selecting a repositioning plan from the plurality of repositioning plans based on predefined criteria;
   subsequent to selecting the repositioning plan, executing the repositioning operations of the selected repositioning plan in the order specified by the repositioning plan to reposition one or more cell regions, the repositioning of the one or more cell regions accomplished while preserving cell properties of each cell in an existing cell region; and
   inserting the new cell region.

2. The processor-implemented method of claim 1, wherein the new cell region is to display data from a third-party application, and the command to insert the new cell region into a spreadsheet is a data refresh command, which, when processed, dynamically updates a data set associated with an existing cell region resulting in an increase to the size of the existing cell region required to display the data set.

3. The method of claim 2, wherein the data refresh command is initiated by the third-party application and the new cell region consists of new cells to be appended to an existing cell region.

4. The processor-implemented method of claim 1, wherein the new cell region is to display data from a third-party application, and the command to insert the new cell region into a spreadsheet is a data insertion command, which, when processed, inserts a new cell region into the spreadsheet, the new cell region displaying data read from an external data source associated with a third-party application.

5. The processor-implemented method of claim 1, wherein the new cell region is to display data associated with a spreadsheet application, and at least one of the one or more existing cell regions contains data from a data source managed by a third-party application.

6. The processer-implemented method of claim 1, further comprising:
   assigning a weight to each repositioning operation based on a calculated distance between a current position of a cell region and a new position of the cell region, the distance being the result of the proposed movement of the cell region from its current position to the new position, the greater the calculated distance the larger the weight assigned;
   for each repositioning plan, summing the weights assigned to the repositioning operations of the repositioning plan to derive a weight for each repositioning plan, wherein selecting a repositioning plan based on predefined criteria includes selecting the repositioning plan having the lowest assigned weight.

7. The processor-implemented method of claim 1, wherein the generating a plurality of repositioning plans includes performing an operation to determine that the repositioning of a first existing cell region, to avoid a layout conflict with the new cell region, will require the repositioning of a second existing cell region to avoid a layout conflict between the first existing cell region and the second existing cell region, and repeating the operation for each successive cell region for which the repositioning of an existing cell region results in a layout conflict with another existing cell region, until no layout conflicts exist between (i) the new cell region and another existing cell region, and (ii) any two existing cell regions.

8. The processor-implemented method of claim 1, wherein generating a plurality of repositioning plans for repositioning one or more existing cell regions of the spreadsheet includes generating a decision tree having (i) a root node representing the state of the spreadsheet with a layout conflict existing between the new cell region to be inserted and one or more existing cell regions, (ii) each internal node representing the state of the spreadsheet after performing a repositioning operation to move one existing cell region from its original position to a new position, the new position resulting in a layout conflict between two existing cell regions, (iii) each leaf node representing a state of the spreadsheet after performing one or more repositioning operations and having no layout conflicts existing between the new cell region and another existing cell region, or any two existing cell regions, and (iv) each path joining the root node with a leaf node representing a unique repositioning plan.

9. The processor-implemented method of claim 1, further comprising:
   prior to processing the command to insert a new cell region into the spreadsheet, generating a render engine data structure mapping the cell reference of each cell in an existing cell region to one or more cell properties, wherein executing the repositioning operations of the selected repositioning plan includes processing the render engine data structure to update the cell reference of each cell in an existing cell region to indicate its new position in the spreadsheet while preserving any cell properties associated with the cell.

10. The processor-implemented method of claim 1, wherein the predefined criteria specifies that the repositioning plan to be selected from the plurality of repositioning plans is the repositioning plan that has the least overall impact on the layout of the one or more existing cell regions.

11. The processor-implemented method of claim 1, wherein the predefined criteria specifies that the repositioning plan to be selected from the plurality of repositioning plans is the repositioning plan that requires moving the least number of the one or more existing cell regions.

12. The processor-implemented method of claim 1, wherein the predefined criteria specifies that the repositioning plan to be selected from the plurality of repositioning plans is the repositioning plan that moves the one or more existing cell regions the shortest distance from their original positions.

13. An apparatus including a processor for executing instructions stored in memory, the apparatus comprising:
   a spreadsheet application having a command processing module to determine that a command to be processed requires that one or more existing cell regions of a spreadsheet interface need to be repositioned to avoid a layout conflict between the one or more existing cell regions and a new cell region to be inserted into the spreadsheet interface as a result of processing the command, wherein a cell region is a group of cells belonging to the same entity or object, or, sharing in common the same data source; and
   a render engine to (i) generate a plurality of repositioning plans for repositioning one or more existing cell regions of the spreadsheet, each repositioning plan specifying a unique combination of repositioning operations and an order for performing the repositioning operations, each repositioning operation specifying a proposed movement of a cell region from its current position to a new position, (ii) select, based on predefined criteria, a repositioning plan from the plurality of repositioning plans, (iii) execute the repositioning operations of the selected repositioning plan in the order specified by the repositioning plan to reposition one or more cell regions, the repositioning of the one or more cell regions accomplished while preserving cell properties of each cell in an existing cell region, and (iv) insert the new cell region.

14. The apparatus of claim 13, wherein the new cell region is to display data from a third-party application, and the command to insert the new cell region into a spreadsheet is a data refresh command, which, when processed, dynamically updates a data set associated with an existing cell region resulting in an increase to the size of the existing cell region required to display the data set.

15. The apparatus of claim 14, wherein the data refresh command is initiated by the third-party application and the new cell region consists of new cells to be appended to an existing cell region.

16. The apparatus of claim 13, wherein the new cell region is to display data from a third-party application, and the command to insert the new cell region into a spreadsheet is a data insertion command, which, when processed, inserts a new cell region into the spreadsheet, the new cell region displaying data read from an external data source associated with a third-party application.

17. The apparatus of claim 13, wherein the new cell region is to display data associated with a spreadsheet application, and at least one of the one or more existing cell regions contains data from a data source managed by a third-party application.

18. The apparatus of claim 13, wherein the render engine includes a layout calculation engine to (i) assign a weight to each repositioning operation based on a calculated distance between a current position of a cell region and a new position of the cell region, the distance being the result of the proposed movement of the cell region from its current position to the new position, the greater the calculated distance the larger the weight assigned, and (ii) for each repositioning plan, sum the weights assigned to the repositioning operations of the repositioning plan to derive a weight for each repositioning plan, wherein selecting a repositioning plan based on predefined criteria includes selecting the repositioning plan having the lowest assigned weight.

19. The apparatus of claim 13, wherein the render engine is to perform an operation to determine that the repositioning of a first existing cell region, to avoid a layout conflict with the new cell region, will require the repositioning of a second existing cell region to avoid a layout conflict between the first existing cell region and the second existing cell region, and is to repeat the operation for each successive cell region for which the repositioning of an existing cell region results in a layout conflict with another existing cell region, until no layout conflicts exist between (i) the new cell region and another existing cell region, and (ii) any two existing cell regions.

20. The apparatus of claim 13, wherein the render engine is to generate a decision tree having (i) a root node representing the state of the spreadsheet with a layout conflict existing between the new cell region to be inserted and one or more existing cell regions, (ii) each internal node representing the state of the spreadsheet after performing a repositioning operation to move one existing cell region from its original position to a new position, the new position resulting in a layout conflict between two existing cell regions, (iii) each leaf node representing a state of the spreadsheet after performing one or more repositioning operations and having no layout conflicts existing between the new cell region and another existing cell region, or any two existing cell regions, and (iv) each path joining the root node with a leaf node representing a unique repositioning plan.

21. The apparatus of claim 13, wherein prior to processing the command to insert a new cell region into the spreadsheet, the render engine is to generate a render engine data structure mapping the cell reference of each cell in an existing cell region to one or more cell properties, wherein executing the repositioning operations of the selected repositioning plan includes processing the render engine data structure to update the cell reference of each cell in an existing cell region to indicate its new position in the spreadsheet while preserving any cell properties associated with the cell.

22. A non-transitory machine-readable storage medium storing instructions, which, when executed by a processor, cause the processor to perform a method comprising:
   responsive to processing a command to insert a new cell region into a spreadsheet, determining that the processing of the command requires that one or more existing cell regions of the spreadsheet be repositioned to avoid a layout conflict between the one or more existing cell regions and the new cell region, wherein a cell region is a group of cells belonging to the same entity or object, or, sharing in common the same data source;
   generating, a plurality of repositioning plans for repositioning one or more existing cell regions of the spreadsheet, each repositioning plan specifying a unique combination of repositioning operations and an order for performing the repositioning operations, each repositioning operation specifying a proposed movement of a cell region from its current position to a new position;

selecting, based on predefined criteria, a repositioning plan from the plurality of repositioning plans;

executing the repositioning operations of the selected repositioning plan in the order specified by the repositioning plan to reposition one or more cell regions, the repositioning of the one or more cell regions accomplished while preserving cell properties of each cell in an existing cell region; and inserting the new cell region.

* * * * *